United States Patent
Acar et al.

(10) Patent No.: US 11,055,402 B2
(45) Date of Patent: Jul. 6, 2021

(54) DYNAMICALLY GENERATED CODE PROCESS SANDBOXING USING AUTHENTICATED POINTERS

(71) Applicant: QUALCOMM Incorporated, San Diego, CA (US)

(72) Inventors: Can Acar, San Diego, CA (US); Robert Turner, San Diego, CA (US); Alexander Gantman, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 16/142,611

(22) Filed: Sep. 26, 2018

(65) Prior Publication Data

US 2019/0102540 A1   Apr. 4, 2019

Related U.S. Application Data

(60) Provisional application No. 62/566,213, filed on Sep. 29, 2017.

(51) Int. Cl.
*G06F 21/53* (2013.01)
*G06F 21/52* (2013.01)
(Continued)

(52) U.S. Cl.
CPC ............ *G06F 21/53* (2013.01); *G06F 12/145* (2013.01); *G06F 21/52* (2013.01); *G06F 21/566* (2013.01);
(Continued)

(58) Field of Classification Search
None
See application file for complete search history.

(56) References Cited

U.S. PATENT DOCUMENTS 8,850,573 B1 * 9/2014 Chen .................. G06F 12/1491
726/22
9,189,375 B1   11/2015 Bastien et al.
(Continued)

FOREIGN PATENT DOCUMENTS

WO    WO-2016060817 A1    4/2016

OTHER PUBLICATIONS

International Search Report and Written Opinion—PCT/US2018/053113—ISA/EPO—dated Jan. 2, 2019.

*Primary Examiner* — Michael Pzyocha
(74) *Attorney, Agent, or Firm* — Loza & Loza LLP

(57) ABSTRACT

A method is provided for safely executing dynamically generated code to avoid the possibility of an attack in unprotected memory space. Upon ascertaining that dynamically generated code is to be executed, a processing circuit and/or operating system kernel restrict the dynamically generated code to use a first memory region within an unprotected memory space, where the first memory region is distinct (e.g., reserved) from other memory regions used by other processes executed by the processing circuit. A first processing stack is maintained for the dynamically generated code within the first memory region. This first processing stack is separate from a general processing stack used by other processes executed by the processing circuit. A stack pointer is switched/pointed to the first processing stack when the dynamically generated code is executed and the stack pointer is switched/pointed to the general processing stack when the dynamically generated code ends.

20 Claims, 6 Drawing Sheets

EXEMPLARY PROCESSOR INSTRUCTION
EXECUTION FOR DYNAMICALLY GENERATED CODE

(51) Int. Cl.
  *G06F 12/14* (2006.01)
  *G06F 21/56* (2013.01)
  *G06F 9/455* (2018.01)
(52) U.S. Cl.
  CPC .. *G06F 9/45516* (2013.01); *G06F 2212/1052* (2013.01); *G06F 2221/033* (2013.01); *G06F 2221/2125* (2013.01)

(56) References Cited

U.S. PATENT DOCUMENTS

| | | | |
|---|---|---|---|
| 9,239,801 B2 | 1/2016 | Patel et al. | |
| 9,250,937 B1* | 2/2016 | Franz | G06F 21/54 |
| 9,256,552 B2 | 2/2016 | Epstein | |
| 9,430,236 B2 | 8/2016 | Gschwind et al. | |
| 2010/0057960 A1* | 3/2010 | Renno | G06F 12/1433 |
| | | | 710/110 |
| 2011/0191848 A1* | 8/2011 | Zorn | G06F 11/00 |
| | | | 726/22 |
| 2013/0205413 A1* | 8/2013 | Grocutt | G06F 21/52 |
| | | | 726/30 |
| 2015/0121354 A1* | 4/2015 | Gschwind | G06F 9/30134 |
| | | | 717/157 |
| 2015/0336005 A1* | 11/2015 | Melnick | A63F 13/73 |
| | | | 463/29 |
| 2015/0356294 A1* | 12/2015 | Tan | G06F 21/54 |
| | | | 726/22 |
| 2016/0092673 A1* | 3/2016 | LeMay | G06F 21/52 |
| | | | 718/1 |
| 2016/0092674 A1* | 3/2016 | Hughes | G06F 21/53 |
| | | | 726/22 |
| 2016/0110545 A1* | 4/2016 | Acar | G06F 21/52 |
| | | | 726/23 |
| 2016/0180085 A1* | 6/2016 | Muttik | G06F 9/467 |
| | | | 726/23 |
| 2017/0033930 A1* | 2/2017 | Costa | G06F 21/606 |
| 2017/0034180 A1 | 2/2017 | Court | |
| 2017/0061419 A1* | 3/2017 | Kim | G06Q 20/102 |
| 2017/0126738 A1* | 5/2017 | Wilkerson | G06F 12/145 |
| 2018/0231949 A1* | 8/2018 | Izzo | G05B 19/0428 |
| 2018/0373646 A1* | 12/2018 | Shwartz | G06F 21/52 |
| 2019/0042799 A1* | 2/2019 | Durham | G06F 21/64 |

* cited by examiner

*EXEMPLARY PROCESSOR INSTRUCTION
EXECUTION FOR DYNAMICALLY GENERATED CODE*

EXEMPLARY INSTRUCTION EXECUTION WITHIN SANDBOXED MEMORY SPACE

DYNAMICALLY GENERATED CODE PROCESS SANDBOXING USING AUTHENTICATED POINTERS

PRIORITY CLAIM

This application claims priority to and the benefit of U.S. provisional patent application No. 62/566,213 filed on Sep. 29, 2017 the entire contents of which is incorporated herein by reference as if fully set forth below in the entirety and for all applicable purposes.

FIELD

The present disclosure relates generally to processor security, and more particularly, prevention of dynamically-generated execution code from triggering memory corruption attack.

BACKGROUND

With the introduction of Advanced RISC Machine v8.3 (ARMv8.3) pointer authentication (PA) extensions, it is possible to have code and data pointers that are protected from memory corruption attacks. In one example of pointer authentication, a cryptographic signature is appended to pointer values so that the cryptographic signature can be verified before a pointer is used. An attacker, lacking the key used to create the cryptographic signature, is unlikely to be able to create valid pointers for use in an exploit. The PA instructions can help enforce code and data flow integrity, but they fail if there are writable and executable memory regions where an attacker can inject and run code. One type of dynamic code generation includes just-in-time compilation (sometimes referred to as dynamic translation and/or run-time compilation) which occurs during runtime or execution of a program, rather than prior to execution. Dynamic code generation is common in modern software and heavily used, for example, in interpreters and browser environments where speed is essential. However, such dynamically-generated execution code may be used by an attacker to exploit writable and executable memory regions not protected by pointer authentication. That is, dynamically generated code may invoke, for example, jump or branch instructions/operations into unprotected memory regions which an attacker can exploit (e.g., inject and run harmful code).

Accordingly, there is a need to prevent dynamically-generated executable code from exploiting unprotected writable and/or executable memory regions to launch attacks.

SUMMARY

Accordingly, there is a need A method is provided, operational at a processing circuit, for securing execution of dynamically generated code. When it is ascertained that dynamically generated code is to be executed, the dynamically generated code may be restricted to use a first memory region within an unprotected memory space, where the first memory region is distinct from other memory regions used by other processes executed by the processing circuit. In some instances, restricting the dynamically generated code may be performed by the processing circuit and/or an operating system kernel operating thereon.

In some instances, the dynamically generated code may be placed in the first memory region immediately upon being generated by the processing circuit. In one example, the first memory region may be defined from within writable execution memory regions of a memory device coupled to or integrated within the processing circuit. In some implementations, flags in memory page tables are used to mark all memory pages descending from the first memory region.

A first processing stack may be maintained, separate from a general processing stack used by other processes executed by the processing circuit, for the dynamically generated code within the first memory region, wherein a stack pointer is switched to the first processing stack when the dynamically generated code is executed and the stack pointer is switched to the general processing stack when the dynamically generated code ends. All memory access and/or transfer of control from the first memory region to other memory regions are enforced to occur through authenticated pointers, ignoring/disabling all other pointer authentication related instructions.

In one implementation, computational instructions used by the dynamically generated code may be restricted to operate within the first memory region.

In one example, a page fault indicator may be triggered if a load, store, and/or branch instruction within the dynamically generated code invokes an address outside the first memory region.

In another example, a page fault indicator may be triggered if a special or system instruction within the dynamically generated code invokes an address outside the first memory region.

In some instances, restricting the dynamically generated code may be performed by the processing circuit and/or an operating system kernel operating thereon.

In some implementations, the processing circuit may be an Advanced Reduced Instruction Set Computer (RISC) Machine (ARM) processor. In one example, return and call instructions may be the only way to transfer control to the first memory region.

According to one implementation, one or more registers may define one or more memory ranges that can be utilized by the dynamically generated code.

Another aspect provides a processing device comprising a memory device coupled to a processing circuit. The processing circuit may be configured to: (a) ascertain when dynamically generated code is to be executed; (b) restrict the dynamically generated code to use a first memory region within an unprotected memory space of the memory device, where the first memory region is distinct from other memory regions used by other processes executed by the processing circuit; (c) maintain a first processing stack, separate from a general processing stack used by other processes executed by the processing circuit, for the dynamically generated code within the first memory region, wherein a stack pointer is switched to the first processing stack when the dynamically generated code is executed and the stack pointer is switched to the general processing stack when the dynamically generated code ends; and/or (d) enforce all memory access and transfer of control from the first memory region to other memory regions to occur through authenticated pointers, ignoring/disabling all other pointer authentication related instructions.

In one example, the processing circuit may be further configured to: (a) restrict computational instructions used by the dynamically generated code to operate within the first memory region; (b) trigger a page fault indicator if a load, store, and/or branch instruction within the dynamically generated code invokes an address outside the first memory region; and/or (c) trigger a page fault indicator if a special or system instruction within the dynamically generated code invokes an address outside the first memory region.

In one implementation, the processing circuit may be an Advanced RISC Machines processor.

In one example, the memory device may be integrated within the processing circuit.

In one instance, the first memory region may be defined from within writable execution memory regions of a memory device coupled to or integrated within the processing circuit.

In one example, the dynamically generated code may be placed in the first memory region immediately upon being generated by the processing circuit.

Another aspect proves a non-transitory processor-readable storage medium having one or more instructions that, when executed by at least one processing circuit, cause the at least one processing circuit to: (a) ascertain when dynamically generated code is to be executed; (b) restrict the dynamically generated code to use a first memory region within an unprotected memory space, where the first memory region is distinct from other memory regions used by other processes executed by the processing circuit; (c) maintain a first processing stack, separate from a general processing stack used by other processes executed by the processing circuit, for the dynamically generated code within the first memory region, wherein a stack pointer is switched to the first processing stack when the dynamically generated code is executed and the stack pointer is switched to the general processing stack when the dynamically generated code ends; and/or (d) enforce all memory access and transfer of control from the first memory region to other memory regions to occur through authenticated pointers, ignoring/disabling all other pointer authentication related instructions.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Overview

A first aspect provides a way to permit dynamically generated code to execute from an unprotected memory space while preventing an attacker from directing the code to another region of the unprotected memory space to launch an attack. The dynamically generated code (e.g., potentially untrusted code) may be isolated within a dynamically defined memory region of the unprotected memory space.

A second aspect provides for a processor to execute some instructions differently when they occur in dynamically generated code being executed out of the dynamically defined memory region of the unprotected memory space. That is, if certain instruction being executed from within the defined memory region attempts to access, branch, or jump to a memory address outside the defined memory region, such instruction is blocked.

A third aspect provides for a stack to be passed between an application stack and a sandbox stack within the defined memory region.

A fourth aspect provides for a single gateway set of authenticated instructions to be used for the dynamically generated code to access address spaces or functions outside the defined memory region. Other pointer authentication related instructions are ignored or disabled.

Exemplary Operating Environment

Figure 1:
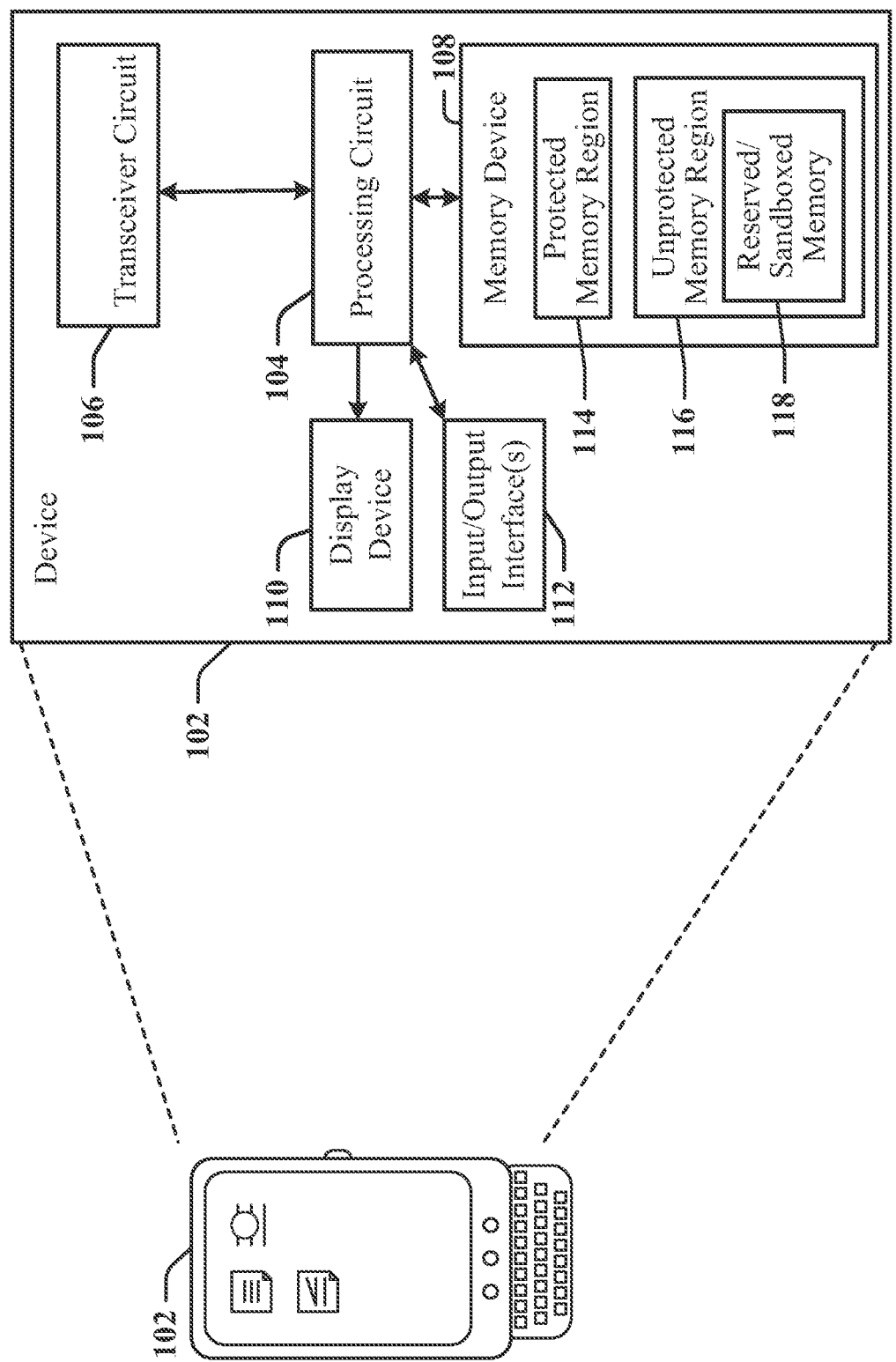
FIG. 1 illustrates an exemplary device configured to prevent or inhibit dynamically-generated executable code from exploiting unprotected memory regions to launch attacks.

FIG. 1 illustrates an exemplary device 102 configured to prevent or inhibit dynamically-generated executable code from exploiting unprotected memory regions to launch attacks. The device 102 may include a processing circuit 104 (e.g., an ARM architecture processor) coupled to a transceiver circuit 106, a memory device 108, a display device 110, and/or one or more input/output devices 112. The memory device 108 may include a protected memory region 114 and an unprotected memory region 116. In some implementations, the processing circuit 104 may serve to load and execute dynamically generate code, also referred to as just-in-time code. In one example, the processing circuit 104 may be configured or configurable to isolate potentially untrusted code within a process while allowing the potentially untrusted code to interface with the rest of the process code in a controlled manner. This approach maintains the ability to execute dynamically generated native code out of writable and executable memory (e.g., unprotected memory space). That is, the dynamically generated code may be executed from a reserved/sandboxed portion 118 of the unprotected memory region 116.

In one implementation, the reserved (sandboxed) memory region 118 may be defined, e.g., within the unprotected memory region 116, for use by dynamically generated (e.g., potentially untrusted) code. When executing dynamically generated code, the processing circuit 104 may be configured to use the reserved/sandboxed memory region 118 while modifying the operation of certain instructions. In various implementations, such reserved/sandboxed memory region/space 118 may be allocated beforehand (e.g., during initialization or boot-up of the operating system) or it may be done immediately prior to or as part of compiling the dynamically generated code.

Figure 2:
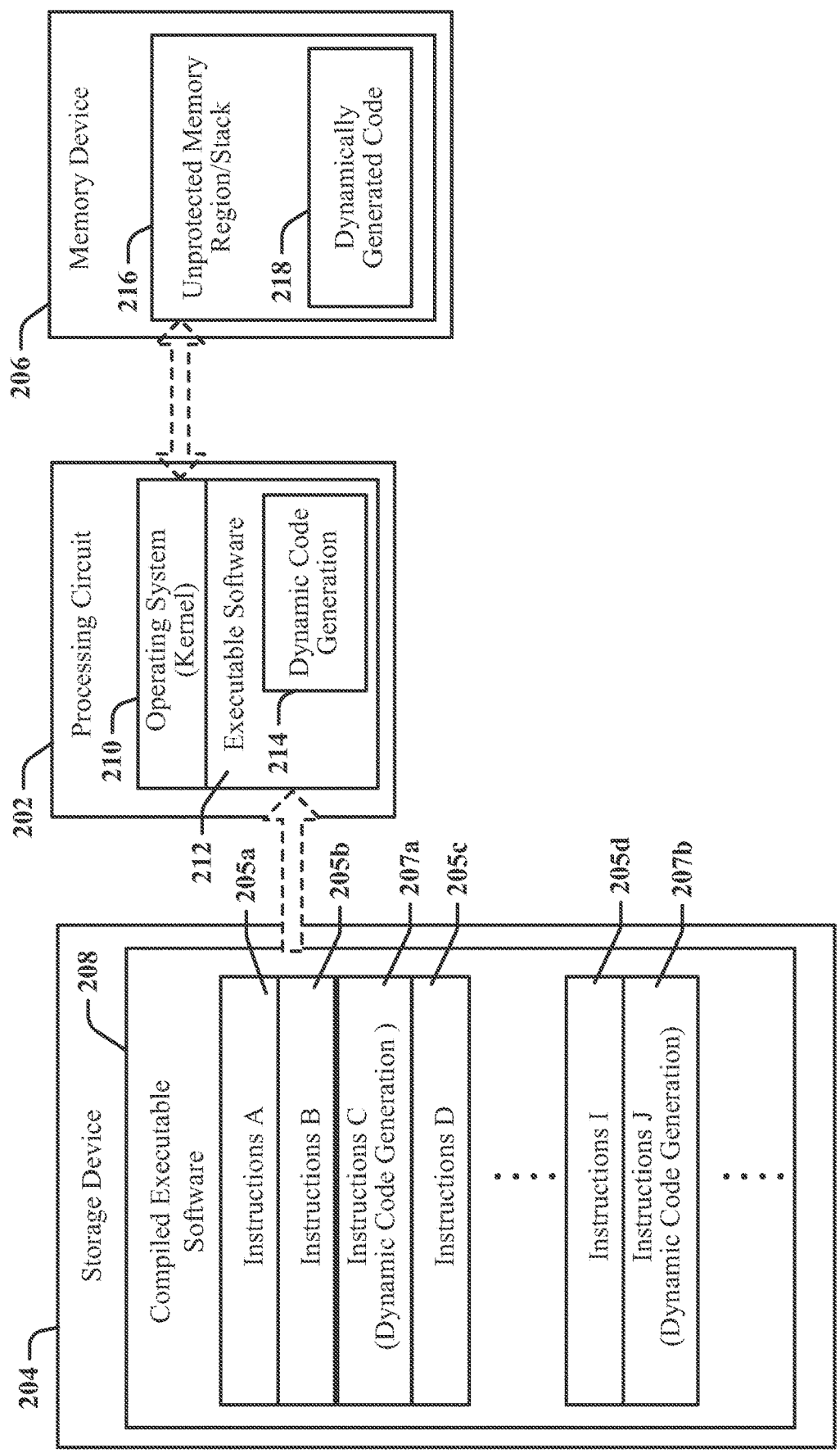
FIG. 2 is a block diagram illustrating a system in which dynamically generated code may be safely executed within an unprotected memory region/stack.

FIG. 2 is a block diagram illustrating a system in which dynamically generated code may be safely executed within an unprotected memory region/stack. In this example, a processing circuit 202 may be coupled to a storage device 204 and/or a memory device 206. The processing circuit 202 may include one or more processors capable of hosting or executing an operating system 210 through which executable software 212 (e.g., code, instructions, etc.) may be executed. In one example, the executable software 212 may include dynamic code generation 214.

The storage device 204 may be a non-volatile storage in which compiled executable software 208 may be stored. The compiled executable software 208 may include various instructions 205 and 207 for execution. Some of the instructions may include instructions for dynamic code generation 207a and 207b. During execution of the instructions C 207a and J 207b, the processing circuit may perform dynamic code generation 214 which results in the generation of dynamically generated code 218 which is stored in unprotected memory space/stack 216 of the memory device 206.

This dynamically generated code 218 may then be executed by the processing circuit 202 under control of the operating system 210.

Figure 3:
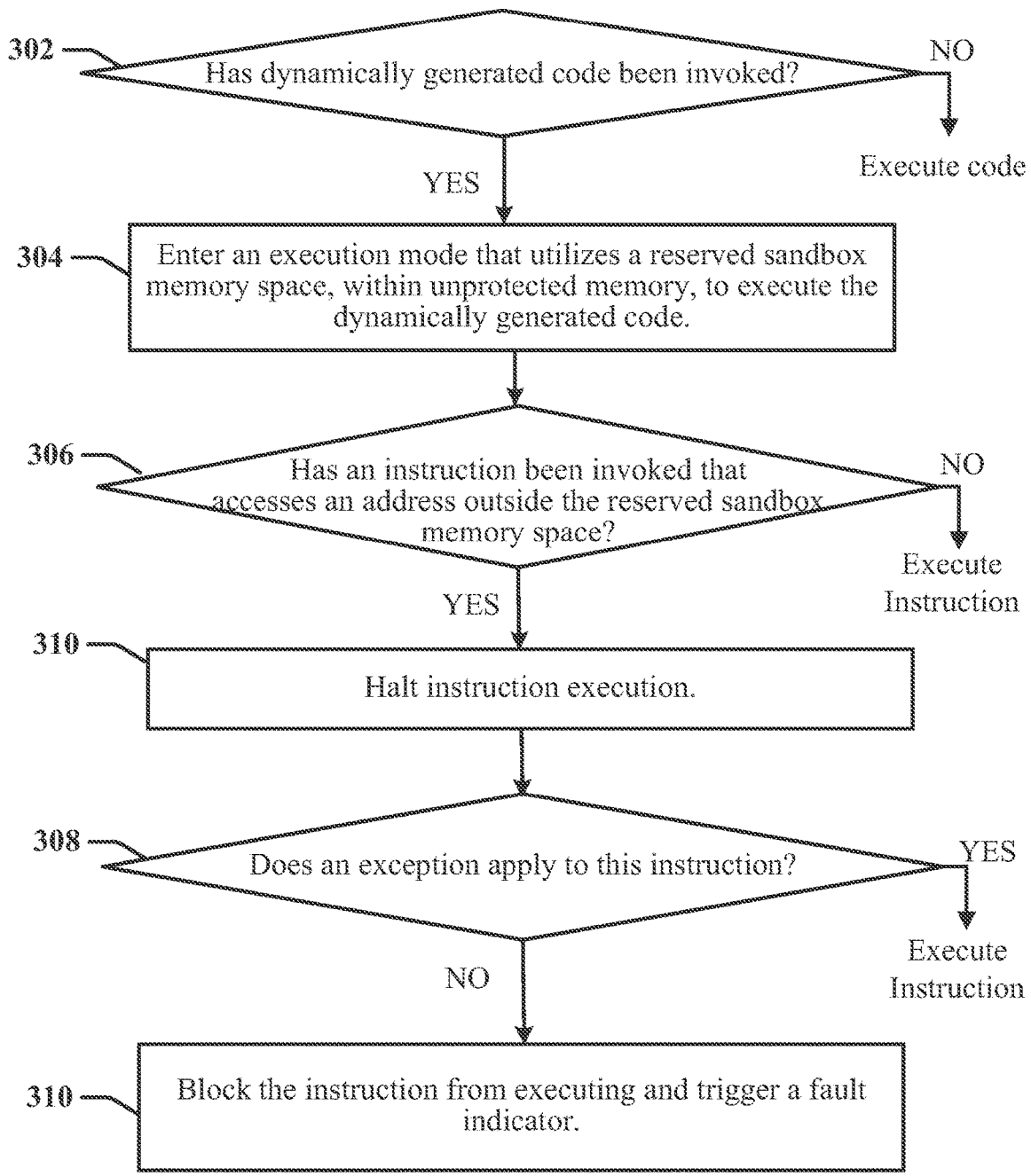
FIG. 3 is a block diagram illustrating an example of how a processor may execute dynamically generated instructions to protect against attacks.

FIG. 3 is a block diagram illustrating an example of how a processor may execute dynamically generated instructions to protect against attacks. A processor, at an operating system kernel level, may ascertain whether dynamically generated code has been invoked 302. If so, then the processor enters into an execution mode that utilizes a reserved sandbox memory space, within unprotected memory, to execute the dynamically generated code 304. In one example, this may also include passing a stack pointer into the reserved sandbox memory space.

As instructions are retrieved and executed from the reserved sandbox memory space, the processor ascertains whether an instruction has been invoked that accesses an address outside the reserved sandbox memory space 306. If so, then the processor halts/suspends execution of the instruction 310 by default. However, there may be certain exceptions that allow such instruction to be executed 308 outside the reserved sandbox memory space (e.g., certain authenticated instructions). If the instruction is not such exception, then execution of the instruction is blocked and a fault indicator is triggered.

Figure 4:
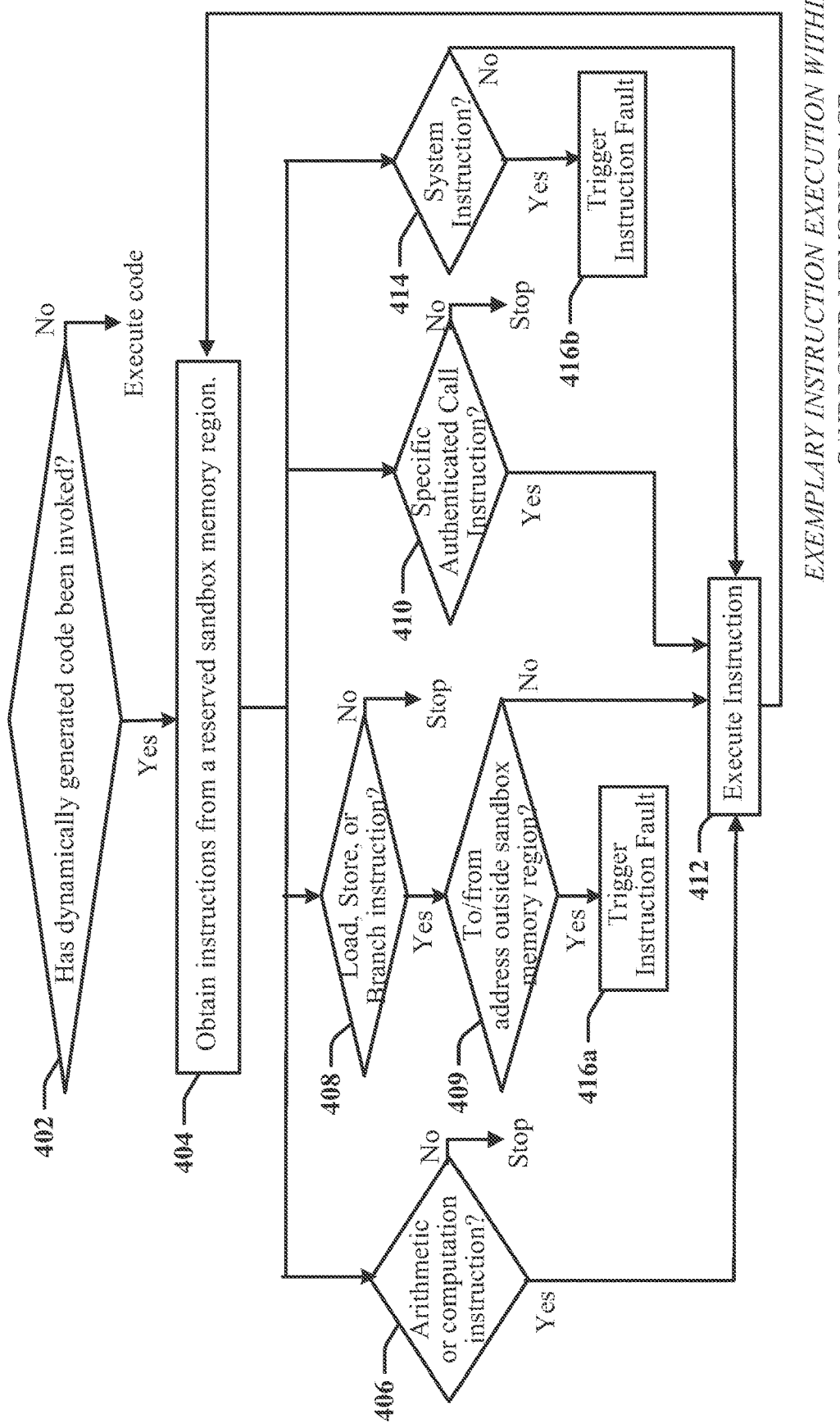
FIG. 4 is a block diagram illustrating one example of instruction execution of dynamically generated code.

FIG. 4 is a block diagram illustrating one example of instruction execution of dynamically generated code. In this example, the operating system (and/or the processor) may determine whether dynamically generated code has been invoked 402. If so, then instructions are obtained from a reserved sandbox memory region 404 where the dynamically generated code resides. If an instruction is an arithmetic or computation instruction (e.g., Arithmetic Logic Unit (ALU) instructions, vector instructions such as scalar vector extensions or SVE), then such instructions can be executed 412.

If the instruction is a load, store, and/or branch instruction 408 and to/from an address outside the reserved sandbox memory region 409, it cannot be executed, and it raises or triggers an instruction fault 416a. However, if the instruction is a load, store, and/or branch instruction 408 and to/from an address in the reserved sandbox memory region, it can be executed 412.

If an instruction is a special or system instruction 414, it also raises or triggers an instruction fault 416.

In general, these instruction execution rules within dynamically generated code make sure that instructions that can change the system state are not allowed to be executed.

In one example, only certain authenticated instructions 410 are allowed to be executed outside the reserved sandbox memory region. For instance, authenticated calls may be one such authenticated instruction. In one example, only the combined AUT+RET (RETA*) and AUT+Call (BLRA*) instructions may be allowed for instructions going outside the reserved/sandboxed memory region. All other pointer authentication (PA) instructions, including pointer authentication code PAC*, are treated as if pointer authentication is disabled (e.g., no operation NOP or fault based on the instruction). The combined AUT+RET (RETA*) and AUT+Call (BLRA*) skip authentication if the destination is in the reserved/sandboxed memory region and act like return RET and branch with a link to register BLR instructions. This restricted authentication rule ensures that the dynamically generated code operating in the reserved sandbox memory region can only call into the rest of the process (i.e., not dynamically generated code) through pointers that are already authenticated/approved by the process itself using the combined call and return PAC* instructions. Data access from the dynamically generated code through combined AUT+Load instructions is not allowed. The combined load instruction has an offset that allows access to a large memory range around the pointer and there are no combined store instructions. Note that there may be further restrictions on the context (e.g., only allow zero contexts) and/or the key (e.g., only allow B key) so that authenticated pointers not intended for dynamically generated code but somehow leaked and passed into the dynamically generated code domain are not usable by the dynamically generated code. In some implementations, only authenticated call instructions are allowed within dynamically generated code. Authenticated branch (BRA*) instructions are not allowed. This is to defend against dynamically generated code branching to an external function with a controlled link register (LR) which would then return to a dynamically generated code-controlled outside memory address. Skipping authentication for BLRA* and RETA* instructions when the destination is within the reserved/sandboxed memory region used by the dynamically generated code makes it possible to execute code that is compiled to use pointer authentication (PA) instructions within the reserved/sandboxed memory region.

Figure 5:
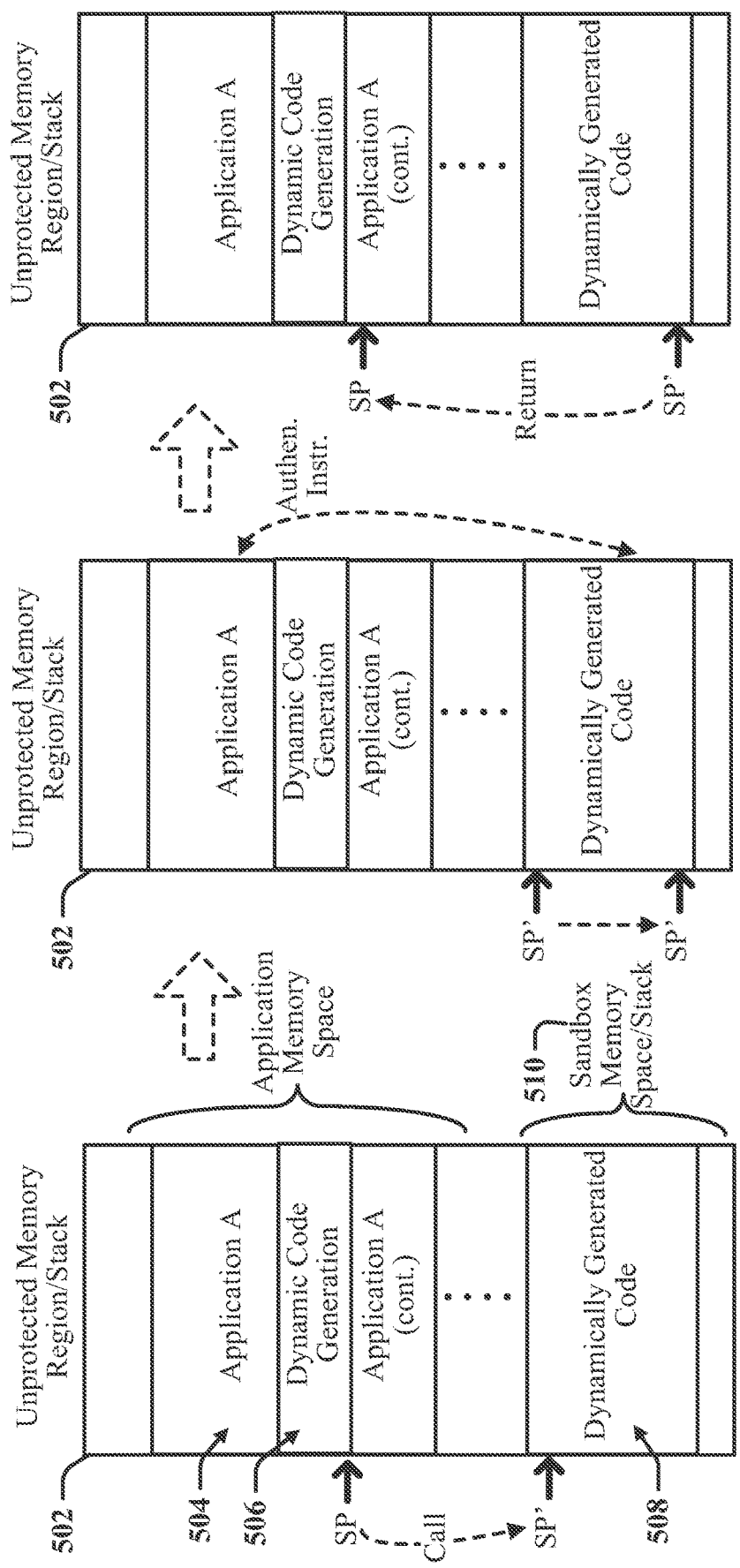
FIG. 5 illustrates an exemplary unprotected memory region/stack for executing dynamically generated code.

FIG. 5 illustrates an exemplary unprotected memory region/stack for executing dynamically generated code. An unprotected memory region/stack 502 may include instructions to execute a first application A 504 which may include dynamic code generation instructions 506. When the dynamic code generation instructions 506 are executed, it creates dynamically generated code 508 that is stored in a reserved sandbox memory space 510 of the unprotected memory region/stack 502.

According to one aspect, when the dynamically generated code 508 is executed by a processor, entry into the reserved sandbox memory space/region 510 must move the stack pointer (SP) into the reserved sandbox memory space/region 510 for the stack pointer (SP) to be usable. This rule allows the dynamically generated code 508 domain to have its own stack (e.g., identified by stack pointer SP'). When calling into the dynamically generated code 508, the caller (e.g., calling instruction or function) sets the stack pointer to a stack inside the reserved sandbox memory space/region 510. In one example, when executing such call into the dynamically generated code 508, the caller may use the ARM instruction PACI[AB]SP, x30 to tag the link register LR with the updated SP so that the dynamically generated code 508 can return through RETA[AB]. This allows the dynamically generated code 508 to return, when finished, through the authenticated return instruction. The caller can then restore the SP before continuing.

There are various ways in which the reserved sandbox memory space/region 510 and/or domain may be defined. In one example, all writable execution regions ([R]WX regions) may be automatically treated as reserved sandbox memory regions. As a further refinement, it may be possible to consider regions of RWX memory that are descended from the same page table subtree as a single reserved sandbox memory region. This would allow multiple distinct sandboxed memory regions to coexist within a process.

In another example, new registers (base+size) may be added that define the dynamically generated code memory range (e.g., reserved or sandboxed memory range). This allows multiple distinct memory ranges and different page permissions to coexist within the sandboxed memory range used by dynamically generated code. However, this option may need additional mechanisms/instructions to configure these registers and would not automatically restrict any WX regions that may be present in the process address space.

In yet another example, a flag may be added to page tables to mark all pages descending from that entry as part of the sandboxed memory. This approach can be used to support multiple ranges if each page table entry (PTE) subtree is treated as a separate sandboxed memory region. This approach also allows arbitrary page permissions to coexist within the sandboxed memory region.

Automatically making writable and executable (WX) regions part of the sandbox memory region 510 would be one way to implicitly enforce data execution prevention (DEP) which pointer authentication relies on. Using an address range may be more flexible and closer to CHERI-like usage (i.e., Capability Hardware Enhanced RISC Instructions processor) of restricting code and data pointers to a range of addresses for sandboxing a piece of code or library. Using page table entries to segment and denote sandboxed memory regions also adds flexibility, but requires additional operating system (OS) support to manage these flags. It may be possible to implement a combination of these techniques as well.

Figure 6:
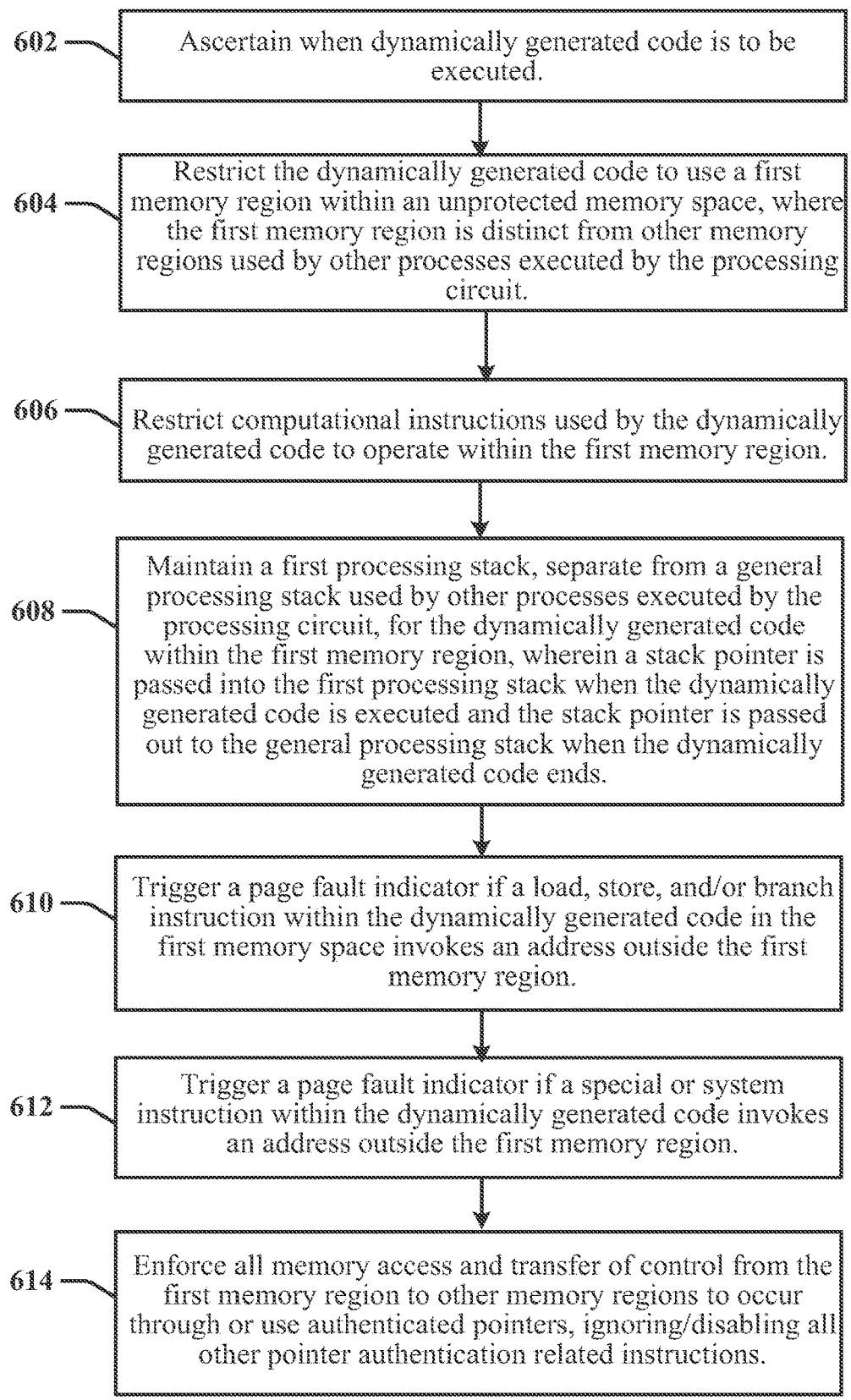
FIG. 6 illustrates a method that may be operational in a processing circuit to inhibit attacks via dynamically generated code.

FIG. 6 illustrates a method that may be operational in a processing circuit to inhibit attacks via dynamically generated code. The processing circuit may ascertain when dynamically generated code is to be executed 602. The dynamically generated code may be restricted, by the processing circuit, to use a first memory region within an unprotected memory space, where the first memory region is distinct from other memory regions used by other processes executed by the processing circuit 604. The unprotected memory space may be outside any secured execution environment. However, the processor may implement a sandbox mode of operation in which access from the dynamically generated code to memory regions outside the first memory region is restricted.

For instance, arithmetic/computational instructions used by the dynamically generated code may be restricted, by the processing circuit, to operate within the first memory region 606.

The processing circuit may also maintain a first processing stack, separate from a general processing stack used by other processes executed by the processing circuit, for the dynamically generated code within the first memory region, wherein a stack pointer is passed into or switched/pointed to the first processing stack when the dynamically generated code is executed and the stack pointer is passed out or switched/pointed to the general processing stack when the dynamically generated code ends (e.g., finishes execution) 608.

If a load, store, and/or branch instruction within the dynamically generated code invokes a memory address outside the first memory region, the processing circuit may trigger a page fault indicator 610.

If a special or system instruction within the dynamically generated code invokes an address outside the first memory region, the processing circuit may trigger a page fault indicator 612.

In one example, the page fault indicator may be a memory fault indicator provided by an operating system kernel.

The processing circuit may enforce (e.g., restrict, force, route, invoke, etc.) all memory access and transfer of control from the first memory region to other memory regions to occur through or use authenticated pointers, ignoring/disabling all other pointer authentication related instructions 614.

In one example, the processing circuit may be an Advanced RISC Machines (ARM) processor.

According to one aspect, one or more registers may be used to define one or more memory ranges that can be utilized by the dynamically generated code.

The first memory region is defined from within writable execution memory regions of a memory device coupled to or integrated within the processing circuit.

In another aspect, flags in memory page tables may be used to mark all memory pages descending from the first memory region.

A processing device is provided comprising a memory device and a processing circuit. The processing circuit may be configured to: (a) ascertain when dynamically generated code is to be generated and/or executed; (b) restrict the dynamically generated code to use a first memory region of the memory device, where the first memory region is distinct from other memory regions used by other processes executed by the processing circuit; (c) restrict computational instructions used by the dynamically generated code to operate within the first memory region; (d) trigger a page fault indicator if a load, store, and/or branch instruction within the dynamically generated code invokes an address outside the first memory region; (e) trigger a page fault indicator if a special or system instruction within the dynamically generated code invokes an address outside the first memory region; (f) authenticate all return and call instructions to/from the dynamically generated code, and ignoring/disabling all other pointer authentication instructions; and/or (g) maintain a first processing stack, separate from a general processing stack used by other processes executed by the processing circuit, for the dynamically generated code within the first memory region, wherein a stack pointer is passed into or switched/pointed to the first processing stack when the dynamically generated code is executed and the stack pointer is passed out or switched/pointed to the general processing stack when the dynamically generated code ends It is understood that the specific order or hierarchy of steps in the processes disclosed is an illustration of exemplary approaches. The specific order or hierarchy of steps in the processes may be rearranged based upon design preferences. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method operational at a processing circuit, comprising:
   ascertaining when dynamically generated code is to be executed;
   restricting the dynamically generated code to use a first memory region within an unprotected memory space, where the first memory region is distinct from other memory regions used by other processes executed by the processing circuit;
   maintaining a first processing stack for the dynamically generated code within the first memory region while the dynamically generated code is being executed, wherein the first processing stack is separate from a general processing stack used by other processes executed by the processing circuit, wherein a stack pointer is switched to the first processing stack when the dynamically generated code is executed and the stack pointer is switched to the general processing stack when the dynamically generated code ends;
   triggering a page fault indicator if at least one of a load, store, or branch instruction within the dynamically generated code invokes an address outside the first memory region; and
   enforcing all memory access and transfer of control from the first memory region to other memory regions to occur through authenticated pointers while ignoring or disabling all other pointer authentication related instructions.

2. The method of claim 1, further comprising:
   restricting computational instructions used by the dynamically generated code to operate within the first memory region.

3. The method of claim 1, further comprising:
   triggering a page fault indicator if a special or system instruction within the dynamically generated code invokes an address outside the first memory region.

4. The method of claim 1, wherein restricting the dynamically generated code is performed by at least one of the processing circuit or an operating system kernel operating thereon.

5. The method of claim 1, wherein return and call instructions comprise an only way to transfer control to the first memory region.

6. The method of claim 1, wherein the processing circuit is an Advanced Reduced Instruction Set Computer (RISC) Machine (ARM) processor.

7. The method of claim 1, wherein one or more registers define one or more memory ranges that can be utilized by the dynamically generated code.

8. The method of claim 1, wherein the first memory region is defined from within writable execution memory regions of a memory device coupled to or integrated within the processing circuit.

9. The method of claim 1, wherein flags in memory page tables are used to mark all memory pages descending from the first memory region.

10. The method of claim 1, wherein the dynamically generated code is placed in the first memory region immediately upon being generated by the processing circuit.

11. A processing device, comprising:
    a memory device;
    a processing circuit coupled to the memory device, the processing circuit configured to:
       ascertain when dynamically generated code is to be executed;
       restrict the dynamically generated code to use a first memory region within an unprotected memory space of the memory device, where the first memory region is distinct from other memory regions used by other processes executed by the processing circuit;
       maintain a first processing stack for the dynamically generated code within the first memory region while the dynamically generated code is being executed, wherein the first processing stack is separate from a general processing stack used by other processes executed by the processing circuit, wherein a stack pointer is switched to the first processing stack when the dynamically generated code is executed and the stack pointer is switched to the general processing stack when the dynamically generated code ends;
       trigger a page fault indicator if at least one of a load, store, or branch instruction within the dynamically generated code invokes an address outside the first memory region; and
       enforce all memory access and transfer of control from the first memory region to other memory regions to occur through authenticated pointers while ignoring or disabling all other pointer authentication related instructions.

12. The processing device of claim 11, wherein the processing circuit is further configured to:
    restrict computational instructions used by the dynamically generated code to operate within the first memory region;
    trigger a page fault indicator if a special or system instruction within the dynamically generated code invokes an address outside the first memory region.

13. The processing device of claim 11, wherein the processing circuit is an Advanced RISC Machines processor.

14. The processing device of claim 11, wherein the memory device is integrated within the processing circuit.

15. The processing device of claim 11, wherein the first memory region is defined from within writable execution memory regions of a memory device coupled to or integrated within the processing circuit.

16. The processing device of claim 11, wherein the dynamically generated code is placed in the first memory region immediately upon being generated by the processing circuit.

17. A non-transitory processor-readable storage medium having one or more instructions that, when executed by at least one processing circuit, cause the at least one processing circuit to:
    ascertain when dynamically generated code is to be executed;
    restrict the dynamically generated code to use a first memory region within an unprotected memory space, where the first memory region is distinct from other memory regions used by other processes executed by the processing circuit;
    maintain a first processing stack for the dynamically generated code within the first memory region while the dynamically generated code is being executed, wherein the first processing stack is separate from a general processing stack used by other processes executed by the processing circuit, wherein a stack pointer is switched to the first processing stack when the dynamically generated code is executed and the stack pointer is switched to the general processing stack when the dynamically generated code ends;

trigger a page fault indicator if at least one of a load, store, or branch instruction within the dynamically generated code invokes an address outside the first memory region; and enforce all memory access and transfer of control from the first memory region to other memory regions to occur through authenticated pointers while ignoring or disabling all other pointer authentication related instructions.

18. The non-transitory processor-readable storage medium of claim 17, further having one or more instructions that, when executed by at least one processing circuit, cause the at least one processing circuit to:

restrict computational instructions used by the dynamically generated code to operate within the first memory region.

19. The non-transitory processor-readable storage medium of claim 17, further having one or more instructions that, when executed by at least one processing circuit, cause the at least one processing circuit to:

trigger a page fault indicator if a special or system instruction within the dynamically generated code invokes an address outside the first memory region.

20. The non-transitory processor-readable storage medium of claim 17, wherein restricting the dynamically generated code is performed by at least one of the at least one processing circuit or an operating system kernel operating thereon.

* * * * *